United States Patent
Furuhashi et al.

(10) Patent No.: US 9,582,528 B2
(45) Date of Patent: Feb. 28, 2017

(54) SYSTEM AND METHOD FOR OPERATING A BIG-DATA PLATFORM

(71) Applicant: Treasure Data, Inc., Mountain View, CA (US)

(72) Inventors: Sadayuki Furuhashi, Mountain View, CA (US); Hironobu Yoshikawa, Mountain View, CA (US); Kazuki Ota, Mountain View, CA (US)

(73) Assignee: Treasure Data, Inc., Mountain View, CA (US)

(*) Notice: Subject to any disclaimer, the term of this patent is extended or adjusted under 35 U.S.C. 154(b) by 0 days.

(21) Appl. No.: 15/147,790

(22) Filed: May 5, 2016

(65) Prior Publication Data

US 2016/0246824 A1    Aug. 25, 2016

Related U.S. Application Data (63) Continuation of application No. 13/671,896, filed on Nov. 8, 2012, now abandoned.

(60) Provisional application No. 61/558,395, filed on Nov. 10, 2011.

(51) Int. Cl.
*G06F 17/30* (2006.01)
*G06F 7/00* (2006.01)

(52) U.S. Cl.
CPC .. *G06F 17/30312* (2013.01); *G06F 17/30315* (2013.01); *G06F 17/30371* (2013.01); *G06F 17/30545* (2013.01); *G06F 17/30569* (2013.01)

(58) Field of Classification Search
CPC ......... G06F 17/30067; G06F 17/30008; G06F 17/30286; G06F 11/1464; G06F 11/1469
USPC ......................................... 707/661, 204, 609
See application file for complete search history.

(56) References Cited

U.S. PATENT DOCUMENTS

| | | |
|---|---|---|
| 6,081,810 A | 6/2000 | Rosenzweig et al. |
| 6,326,962 B1 | 12/2001 | Szabo |
| 7,783,679 B2 | 8/2010 | Bley |
| 7,917,463 B2 | 3/2011 | Dagum et al. |
| 8,024,329 B1 | 9/2011 | Rennison |
| 2006/0112123 A1* | 5/2006 | Clark .............. G06F 17/246 |
| 2008/0071796 A1 | 3/2008 | Ghuneim et al. |

(Continued)

FOREIGN PATENT DOCUMENTS

| | | |
|---|---|---|
| JP | 2009266007 | 11/2009 |
| JP | 2010257426 A | 11/2010 |

(Continued)

OTHER PUBLICATIONS

"IBM InfoSphere Release Notes" [online]. May 27, 2011. URL: <http://pic.dhe.ibm.com/infocenter/bigins/v1r1/index.sp?topic=%2Fcom.ibm.swg.im.infosphere.biginsights.com%2Fdoc%2Fr0057893.html>.

*Primary Examiner* — Usmaan Saeed
*Assistant Examiner* — Raquel Perez-Arroyo
(74) *Attorney, Agent, or Firm* — Jeffrey Schox; Padowithz Alce (57) ABSTRACT

A system and method for operating a big-data platform that includes at a data analysis platform, receiving discrete client data; storing the client data in a network accessible distributed storage system that includes: storing the client data in a real-time storage system; and merging the client data into a columnar-based distributed archive storage system; receiving a data query request through a query interface; and selectively interfacing with the client data from the real-time storage system and archive storage system according to the query.

24 Claims, 7 Drawing Sheets

(56) References Cited

U.S. PATENT DOCUMENTS

| | | | |
|---|---|---|---|
| 2008/0208820 A1* | 8/2008 | Usey | G06F 17/30616 |
| 2009/0240663 A1 | 9/2009 | Plattner et al. | |
| 2010/0082630 A1 | 4/2010 | Zagelow et al. | |
| 2011/0004589 A1* | 1/2011 | Rischar | G05B 19/4185 |
| | | | 707/713 |
| 2011/0113025 A1 | 5/2011 | Piedmonte | |
| 2011/0153603 A1* | 6/2011 | Adiba | G06F 17/30548 |
| | | | 707/737 |
| 2011/0191361 A1* | 8/2011 | Gupta | G06F 17/30424 |
| | | | 707/763 |
| 2012/0110004 A1* | 5/2012 | Meijer | G06F 17/30569 |
| | | | 707/769 |
| 2012/0311581 A1* | 12/2012 | Balmin | G06F 9/5066 |
| | | | 718/100 |
| 2013/0151563 A1 | 6/2013 | Addepalli et al. | |

FOREIGN PATENT DOCUMENTS

| | | |
|---|---|---|
| JP | 2011216029 | 10/2011 |
| WO | 2011111532 A1 | 9/2011 |

\* cited by examiner

```
$ td table:create myapp www_access
$ td schema:set myapp www_access url:string ip:string
size:int
$ td query -d myapp "select sum(size) from www_access
where url='/'"
$ td sched:create sum-hourly "0 0 * * *" -d myapp "select
sum(size) from www_access"
```

SYSTEM AND METHOD FOR OPERATING A BIG-DATA PLATFORM

CROSS-REFERENCE TO RELATED APPLICATIONS

This application is a continuation of U.S. patent application Ser. No. 13/671,896, filed 8 Nov. 2012, which claims the benefit of U.S. Provisional Application No. 61/558,395, filed 10 Nov. 2011, both of which are incorporated in their entirety by this reference.

TECHNICAL FIELD

This invention relates generally to the data-intensive distributed systems field, and more specifically to a new and useful system and method for operating a big-data platform in the distributed systems field.

BACKGROUND

Developments in technology have led to an increasing amount of available data. Such data has numerous useful applications and many companies could benefit from being able to analyze that data. Specialized systems have been developed to work with large datasets. The data platform commonly known as HADOOP™ is one exemplary platform designed for large datasets that leverages MapReduce. However, many websites and applications are built on system infrastructures that differ greatly from those that can take advantage of large quantities of data. To take advantage of platforms such as the data platform commonly known as HADOOP™, a system would have to be re-engineered for the new platform. Such infrastructure changes are time and cost prohibitive. Additionally, a platform designed for large datasets requires highly specialized and knowledgeable personnel. Many of the people working on existing websites and applications do not have such skills. Thus, there is a need in the data-intensive distributed systems field to create a new and useful system and method for integrating with a data-intensive infrastructure. This invention provides such a new and useful system and method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. System for Operating a Big-Data Platform

Figure 1:
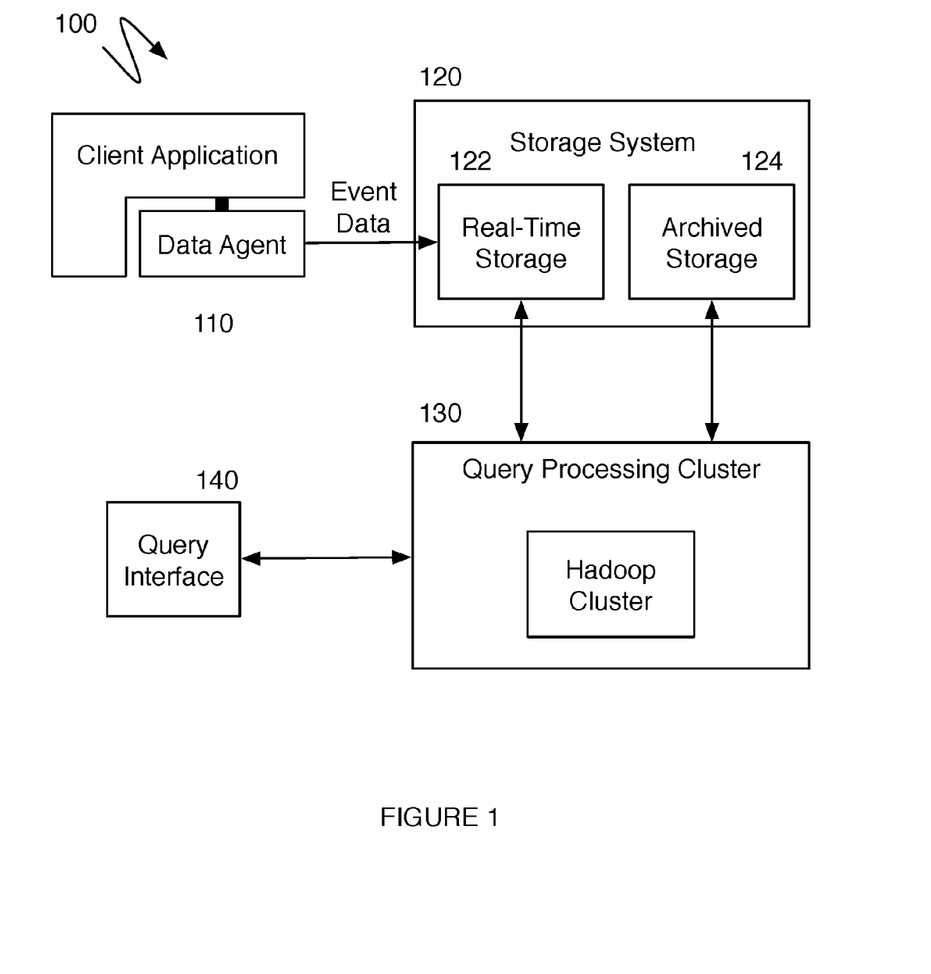
FIG. 1 is a schematic representation of a system of a preferred embodiment of the invention.
Figure 2:
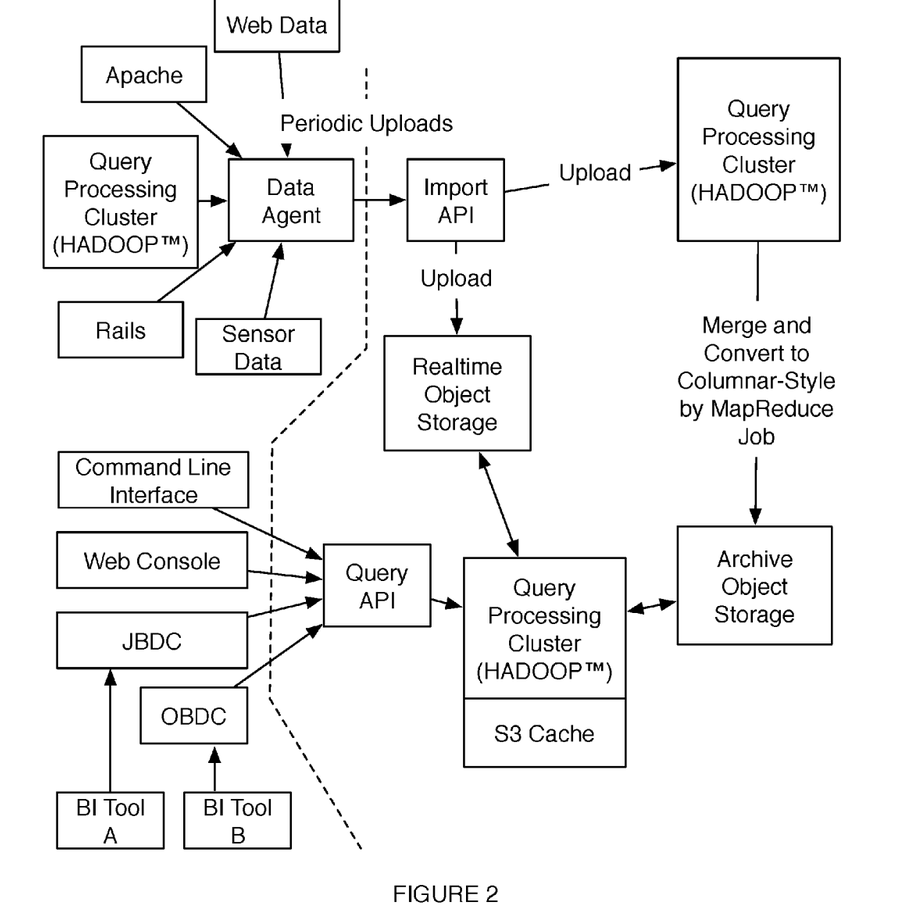
FIG. 2 is an exemplary schematic representation of an implementation of a system of a preferred embodiment of the invention.

As shown in FIG. 1, a system 100 for operating a big-data platform of a preferred embodiment of the invention includes a client data agent 110 integrated with a discrete event channel, a remote distributed storage system 120, a query processing cluster 130, and a query interface 140. The remote distributed storage system may additionally include a real-time storage system 122 and an archive storage system 124. The system functions to enable applications built on any infrastructure to benefit from the data processing capabilities of a specialized and dedicated infrastructure. As the system functions independently from the application of a client, the big data processing requirements are abstracted to a simple interface for the client. The system preferably uses a columnar-based archive storage system 124 and a data-intensive query processing cluster 130 deployed on a distributed computing environment to enable fast data interactions on scalable system. The system may additionally be adapted to function as a multitenant service so that numerous clients can utilize the system simultaneously. Data of various users is preferably stored securely and in a format isolated from other user data. The query processing cluster is preferably shared by users of the multitenant infrastructure. The system 100 is suitable for use with big datasets such as datasets measured in the terabytes, petabytes, or even greater data size. The system has the benefits of using generally discrete and unorganized data encountered periodically during the operation of an application and converting such unstructured data into a structured data from large dataset. As a related benefit the system enables existing applications and data-sources to easily and organically benefit from the big-data platform. This may be true even for existing application and data-sources that were designed without any considerations for big-data processing. Put another way, the system enables traditional applications to benefit from analysis of data that requires non-traditional data management tools. As shown in FIG. 2, the system can preferably be built utilizing the data platform commonly known as HADOOP™ and cloud hosting services for some base components. The system may alternatively include any suitable components or be built on any suitable infrastructure.

Figure 3:
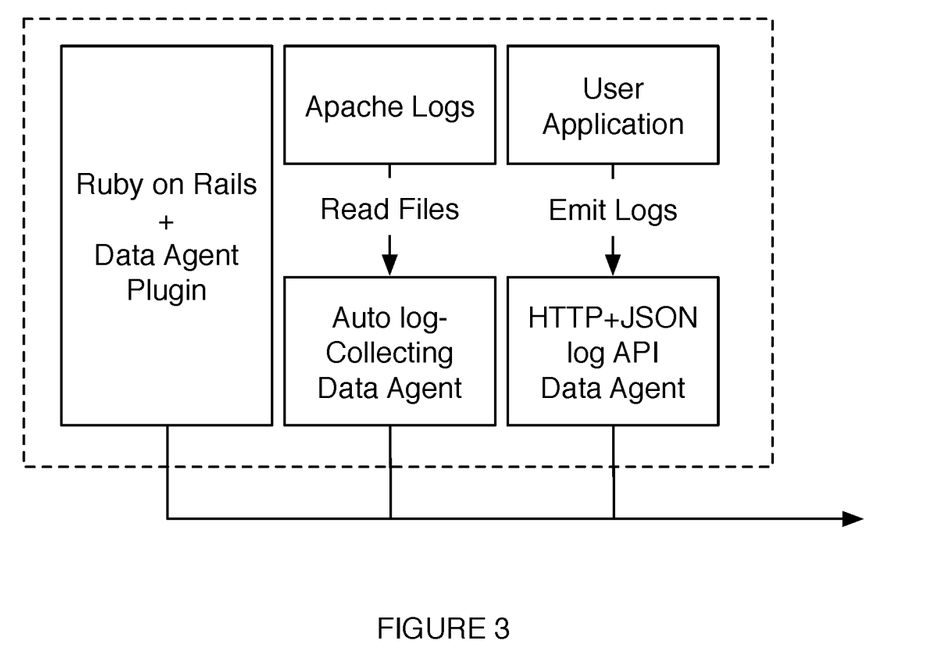
FIG. 3 is a detailed schematic of an example of a data agent integrating with a client application.

The client data agent 110 of a preferred embodiment functions to integrate with client systems to communicate small portions of data to the remote distributed storage system. An event channel or interface preferably enables a website, application, service, or any suitable networked program to supply event data. The client data (e.g., event data) is preferably discrete event data. Discrete event data preferably has an association to the time of an event, the kind of event, and/or any suitable additional event attributes. An event channel may be a database log, app log, syslog, sensor data stream, web content, or any suitable source of data. Typically, an application will generate client data in response to actions of a user of the application, and the client data will include information of the action. Preferably, the client data is formatted as a plurality of key-value pairs. A sequence of client data is preferably organized in row format. Alternatively, the client data may have any suitable format. The client data agent 110 is preferably a daemon providing a gateway to the data-intensive infrastructure. The client data agent is preferably a plugin. For example the client data agent may be a ruby gem, but may alternatively be a web service, a library, a script, an application programming interface (API), or any suitable agent with an interface to client systems and a communication channel to the storage system 120. Additionally, the data agent may be integrated into multiple portions of an application as shown in FIG. 3. The client data agent 110 preferably includes networking interface to periodically communicate with the storage system 120. The client data agent may additionally include a data compressor 112 that functions to compress event data before communicating to the storage system 120. The data compressor 112 preferably is a data binary serializer, and preferably converts data to MessagePack or any suitable data interchange format. MessagePack is a small and compact binary serialization format with a JSON-like syntax. Additionally the client data agent 110 may include configuration to identify the client, user account, or application when communicating with the remote storage system. A private key may be used to uniquely identify event data and distinguish the event data from other clients using the multitenant system.

The client data agent 110 may additionally include a pluggable architecture to enable arbitrary data sources to be used in the client data agent. The pluggable architecture preferably includes an input plugin interface and an output plugin interface. The input plugin interface is preferably configured to allow plugins from third party developers or any suitable entity to be developed to pull data from any suitable source. For example, an input plugin may be written to pull data in from a particular site. The output plugin interface is preferably configured to allow plugins from third party developers or any suitable entity to be developed to customize the output of data from the client data agent. The output plugin may translate data, customize the transmission of data, or provide any customized functionality for the output of the client data agent 110. In one example, the output plugin may convert the data units or language. In another example, the output plugin may be used to transmit the data to multiple destinations.

The remote distributed storage system 120 of a preferred embodiment functions to store the event data. The event data coming into the distributed storage system is preferably discrete (e.g., organized by time based events) and substantially unorganized. The storage system 120 in combination with the query processing cluster enables organized big data analysis to be output from the system. Big data may be characterized as greater than a terabyte of data, a petabyte of data, or any suitable size. In one exemplary application, big data is characterized by greater than 1 terabyte of data storing a billion web clicks, but may alternatively be characterized by any suitable sized data. The storage system is preferably hosted on a distributed cloud storage system such as Amazon's S3/EC2, but may alternatively be any suitable infrastructure. The data is preferably kept in a compressed format (e.g., MessagePack format). The remote distributed storage system preferably functions to store data for both real-time querying and for large batch data querying, but may alternatively partition and group data in any suitable way.

Figure 4:
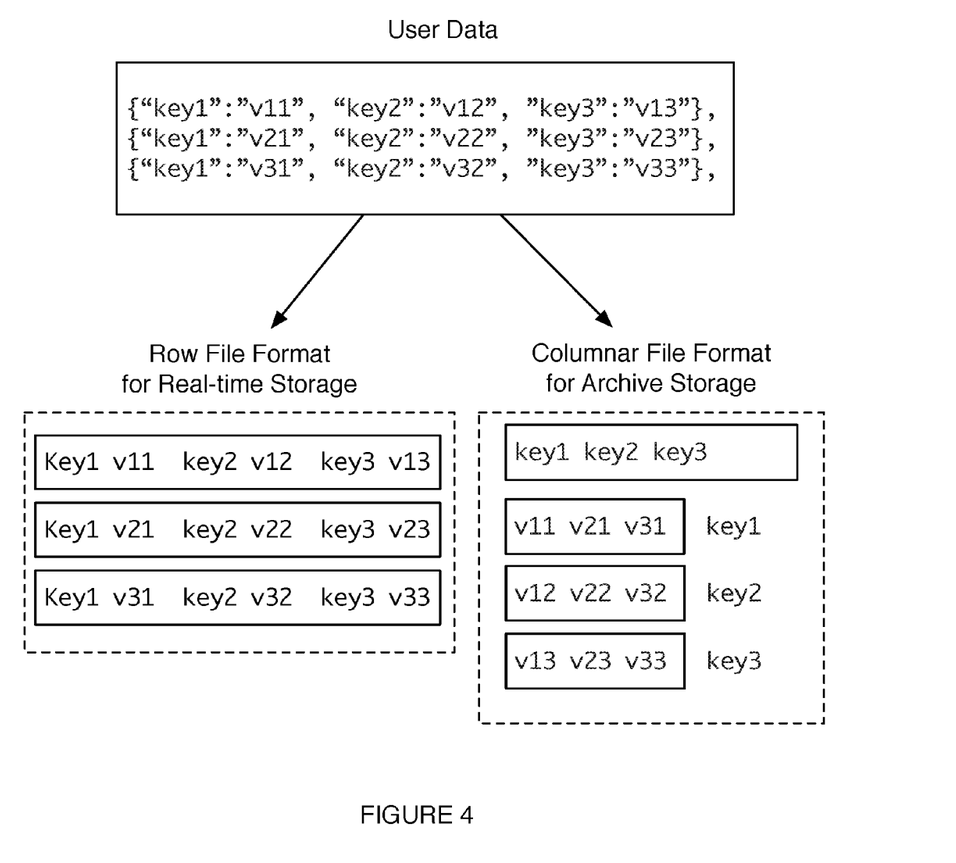
FIG. 4 is a representation of the conversion of user data to row and columnar formats for real-time and archived storage.

The remote distributed storage system preferably includes a real-time storage system 122 and an archive storage system 124. The remote distributed storage system 120 is preferably structured to initially store discrete data sent from the client data agent 110 in the real-time storage system 122, and after a temporal delay, a data converter merges or otherwise prepares the data for storage in the archive storage system 124. As shown in FIG. 4, the real-time storage system 122 preferably stores the client data as row data, and the archive storage system 124 preferably stores the data in a columnar data format. The data is preferable merged and converted to columnar-style using a MapReduce job. Row file format has the benefit of being easy to append new rows, add new keys, and is suitable for writing data. Columnar file format has the benefit of enabling unnecessary keys and values to be skipped, can be highly compressed due to coherency, and is suitable for archiving and reading. The columnar data format additionally can provide optimizations and efficiencies when querying the large data sets of the archive storage system. If the system is implemented for multitenant application, the data may additionally be stored according to an account identifier. The data may additionally be encrypted or suitable secured. Data for different users is preferably kept isolated from access from other unauthorized user accounts.

The query processing duster 130 of a preferred embodiment functions to convert a query instruction communicated through a query interface to a data processing method. Depending on the query instruction, real-time data and/or archived data may be processed. The query processing cluster 130 is preferably configured on a remote distributed computing infrastructure such as Amazon's Elastic Compute Cloud. The query processing cluster 130 may be any suitable collection of a plurality of processing units, virtual or physical, that are preferably distributed but may be co-located or positioned in any suitable configuration. In a multitenant implementation of the system, queries from a plurality of different user accounts are preferably distributed amongst the shared resources of the query processing cluster 130. The query processing cluster 130 is preferably a data-intensive processing cluster such as the data platform commonly known as HADOOP™. The data-intensive processing duster is preferably configured to execute data mapping and reduction processes in querying data. More preferably the query processing cluster 130 is a data platform commonly known as HADOOP™ cluster implementing MapReduce processes. A single query processing module preferably queries the real-time storage system 122 and the archive storage system 124. More preferably, a query processing module of the query processing duster 130 preferably queries the real-time storage system 122 and the archive storage system 124 in a cooperative and coordinated manner to return a unified, cohesive query result that incorporates real-time and archived data.

In an alternative embodiment, the query processing cluster 130 may include a real-time query module and a batch query module. A real-time query module preferably performs queries on the real-time storage system to provide time relevant time analysis. The real-time query module may use a real-time optimized data platform commonly known as HADOOP™ base for performing queries. A batch query module functions to perform big data queries on the archived storage system 124. The batch query module preferably utilizes a data platform commonly known as HADOOP™ infrastructure to facilitate working with the big data. The archived storage system is optimized to provide large volumes of data in a format efficient for query processing.

Figure 5:
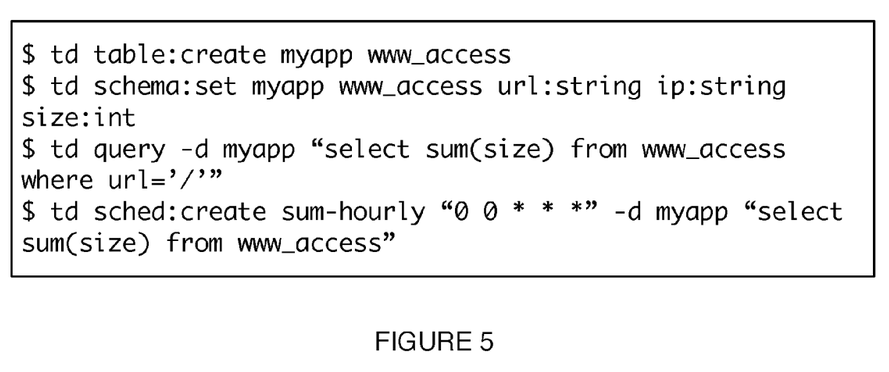
FIG. 5 is an exemplary sample of a command line interface.

The query interface 140 of a preferred embodiment functions to provide a user access to the stored data. A query interface 140 is preferably used by a user to obtain information about data captured by the client data agent 110. The query interface 140 may be used for requesting information but may also be used for interacting with the data such as creating a database or table, importing data, scheduling a query, setting a schema for the data, or any suitable action. The query interface takes user actions and preferably communicates them to the query processing cluster 130. In one variation, the query interface is a command line interface. A command line interface preferably enables users to issue relational database-like query commands to interact with data. The command line interface is preferably modeled to be similar to that of working with a relational database such as the database commonly known as MYSQL™ even though the backend infrastructure is drastically different. This functions to allow users without in-depth knowledge of the data-intensive infrastructure (e.g., the data platform commonly known as HADOOP™) to issue to control and interact with the data using familiar commands as shown in FIG. 5. In a second variation, the query interface 140 is a web console interface. The web console is preferably website or application providing a graphical user interface. Data visualizations, analytics reports, and any suitable form of data representation may be part of such an interface. In a third variation, the query interface 140 may be an API used by third party applications. In a fourth variation, the query interface 140 may be business intelligence tool driver. For example, a Java Database Connectivity (JDBC) or Open Database Connectivity (ODBC) interface can enable access from various business intelligence tools such as Jasper Soft, Tableau, Excel, Pentaho, or any suitable tool. Any of the above variations or other suitable query interfaces may be used in any suitable combination.

2. Method for Integrating with a Data-Intensive Infrastructure

Figure 6:
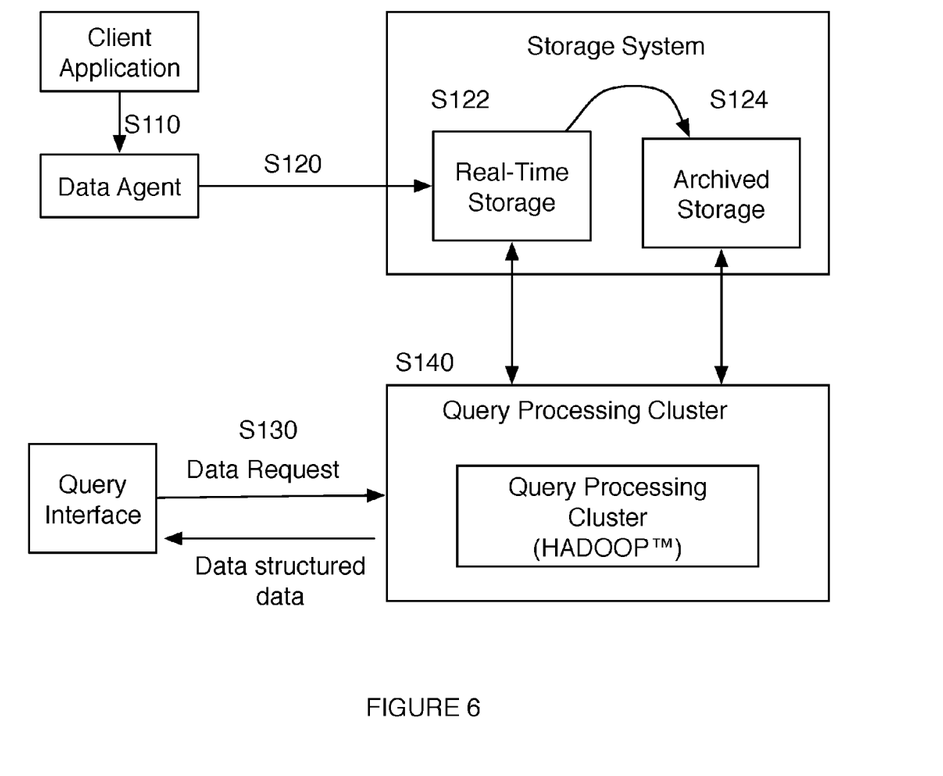
FIG. 6 is a schematic representation of a method of a preferred embodiment of the invention.

As shown in FIG. 6, a method for integrating with a data-intensive infrastructure of a preferred embodiment includes retrieving discrete, client data S110; storing discrete, client data in a remote storage system S120; wherein storing the data includes storing client data in a real-time storage system S122; and storing client data in a columnar format in an archive storage system S124; receiving a data request through a user interface S130; and selectively interacting with the data from the real-time storage system and the archive storage system S140. The method functions to enable applications built on any infrastructure to benefit from the data processing capabilities of a big data specialized infrastructure. The method preferably leverages the columnar-based distributed archive storage system and a data intensive processing cluster (e.g., the data platform commonly known as HADOOP™) to provide fast and scalable data analytics and services. The method takes unorganized discrete event recordings of a wide range of client types and transforms the data into queryable organized data. The method is preferably used in big data applications (e.g., datasets larger than terabyte or in some cases a petabyte). The method is preferably utilized by a data processing service provider. The service provider preferably enables a plurality of clients to utilize the infrastructure in a multi-tenant environment. The method is preferably implemented on a system as described above, but any suitable system may alternatively implement the method.

Step S110, which includes retrieving discrete, client data, functions to receive small pieces of client data from a client application. The discrete, client data is preferably collected by a plug-in, library, or application programming interface integrated with a client application. The client data is preferably event data including a timestamp associated with the parameters of the client data. Client data is preferably received at a distributed storage system. More preferably a data import module receives the data from a client data agent through an application programming interface (API) and appropriately adds the client data to the storage system. A client agent integrated with the client application preferably retrieves events from a data source, and more preferably the events are retrieved as the events occur. The client data may alternatively be any suitable form of data. An application of a client can preferably easily integrate with such a client agent, without making system level changes to the application. In the case of a Ruby on Rails application, this may include adding a data agent gem, and performing some initial setup such as specifying a schema. The data agent can then relay appropriate information. Retrieving discrete, client data may include at a client data agent retrieving logs, converting relational databases of an application, receiving event notifications, retrieving online data, retrieving sensor data, and/or performing any suitable action to obtain data. The client agent may additionally interface with an input plugin. The input plugin may be configured to retrieve any suitable form of data. In some situations a plurality of sources are used to retrieve discrete, client event data. Client event data is preferable key-value pair data characterizing an event or an object to be stored.

Additionally, retrieving client event data may include compressing client event data. Compressing preferably includes serializing the event data, which may comprise of transforming the data from a human-readable format to a retrievable binary serialization in a JSON-like format. MessagePack library is one suitable data interchange format. As the data agent communicates event data to a storage system, the data agent may additionally buffer communication to avoid overloading a data importing system of the storage system. The method may additionally enable dynamic schema. Dynamic schema functions to enable flexibly setting data schema. One possible benefit is that schema information for client data is not required prior to adding data. A generic schema may be applied to data by default. The schema of data may later be updated through a data query request and interacting with the data, which can result in enhanced performances for subsequent queries.

Step S120, which includes storing discrete, client data in a remote storage system, functions to transfer data from an application to storage infrastructure of a big data specialized system. A client agent preferably periodically communicates client event data to the storage system. Alternatively, the client agent can continuously communicate client event data to the storage system. As discussed above, the event data is preferably in a compressed format for communication. Storing the event data in the storage system preferably enables the event data to be organized for optimized analytics. The client data is preferably stored as time series data. The data may include a timestamp for the collection of the data, for the storing in real-time storage system, for the storing in archive storage, and/or any suitable timestamp.

As two preferred sub-steps, storing client event data additionally includes storing client event data in a real-time storage system S122 and storing client data in a columnar format in an archive storage system S124, which function to store data in formats suitable for real-time applications and big data applications respectively. The storage system preferably initially stores event data in a real-time storage system. Preferably, after some temporal delay, data is moved from the real-time data storage system to the archived storage system, though event data may alternatively be replicated within sub-storage systems. Storing in these two sub-storage systems enables data to be formatted for different applications. Real-time data may have more queries to look at events as a whole. The event data is preferably stored in row format in the real-time storage system. Row format preferably simplifies appending a new row to the data, adding new keys, and is preferably suitable for writing. Initially storing in the real-time data storage additionally acts as a buffer as data is merged or otherwise converted into a structure suitable for archived storage. The event data is preferably converted to a MapReduce format for storing in the archive storage system, which functions to make the archived event data to be more accessible for batch queries. In converting to a MapReduce format, the event data is preferably stored in a columnar format. Columnar format preferably enables unnecessary keys and values to be skipped when reading. Columnar format additionally has improved compression rate and is suitable for archiving and reading. Conversion to the MapReduce format preferably occurs within the storage system to alleviate clients from performing the difficult conversion process.

Step S130, which includes receiving a data request through a user interface, functions to obtain instructions indicating the intensions of a user or system. The data request is preferably obtained through an interface, and then subsequently communicated to a query processing cluster such as a data platform commonly known as HADOOP™ enabled cluster. The data request is preferably communicated through a user interfaces such as a command line interface, a web console, an API, a business intelligence tool interface, or through any suitable mechanism. Preferably, a data request is a query request that requires a response of corresponding structured data from the storage system. Alternatively, a data request may be an instruction requesting the modification to the stored data such as by creating a database or table, setting a schema, importing data interactively, or performing any suitable action. In one variation, data requests are received through a command line interface and the requests may additionally be converted from a relational database-like query command format to a format compatible for the data storage and query processing cluster. For example, SQL like database commands are preferably converted to a MapReduce format suitable for use with the data platform commonly known as HADOOP™. In another variation, data requests are received through a business intelligence tool interface. The business intelligence tool interface is preferably a driver for a Java Database Connectivity (JDBC) or Open Database Connectivity (ODBC) interface. Such business intelligence tool interfaces preferably enables data access and interactions from various business intelligence tools such as Jasper Soft, Tableau, Excel, Pentaho, or any suitable tool.

Step S140, which includes selectively interacting with the data from the real-time storage system and the archive storage system, functions to perform the data request. For data queries, a query-processing cluster preferably selectively queries the real-time storage system and/or the archived storage system. When the query is for real-time information, the real-time storage system is preferably queried. When the query is a batch query, the archived storage system is queried. Data in the archived storage system is preferably processed quicker and more efficiently because the data is preferably stored in a columnar format. A query mechanism preferably allows part of the data to be selectively queried as opposed to querying the whole columnar dataset. For example, leveraging the columnar format and the time-series configuration of the archive data, a range-get operation for a query on a single parameter of client event data point can be retrieved substantially faster and efficiently than retrieving such data arranged in a row format. The system may alternatively select all of a columnar dataset. The query processing cluster may additionally analyze the query request and limit the queried data. Such query oversight can preferably provide performance improvements. In the variation where the data request is setting a schema, the query processing cluster preferably canonizes the data using the specified schema. Additionally, the query processing cluster may decompress the data for delivery to the user. For example, if data was compressed using MessagePack, the data is preferably converted to the original format. Additionally, the results or sub-calculations of a data request may be cached for future data requests. The method may include the step of returning structured data, which functions to return results of a data query. The data results are preferably communicated through the query interface used to make the data request. The results may be represented in an infographic, text based result summary, as table styled data, a spreadsheet, a csv-data file, or in any suitable data format.

Figure 7:
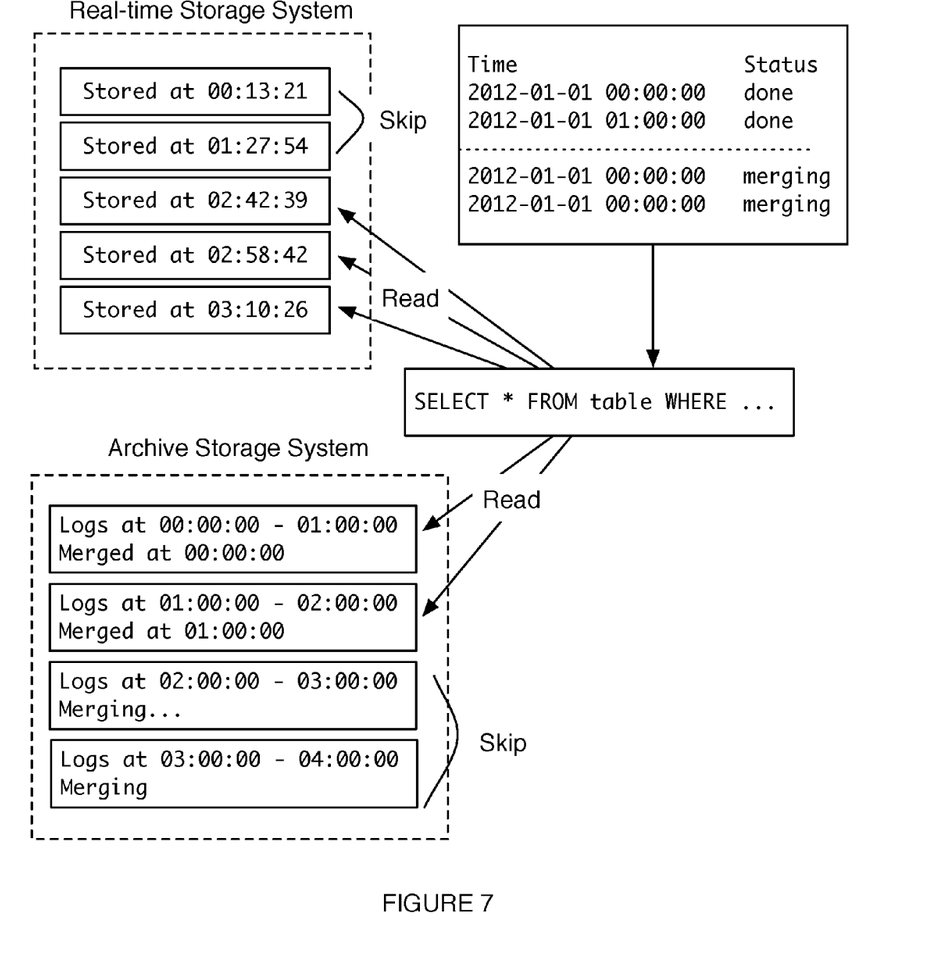
FIG. 7 is a schematic representation of a variation cooperatively querying a real-time storage system and an archive storage system of a preferred embodiment of the invention.

In querying data, the selective interaction preferably includes cooperatively querying the real-time storage system and the archive storage system, which functions to distribute the query over multiple storage systems to retrieve a single cohesive query result. Query processing cluster preferably leverages the timestamps of the various client data in the real-time storage system and the archive storage system to query non-redundant client data. When client data is being merged or otherwise structured for storage in the archive storage system, merge status information preferably indicates what client data has been added to the archive storage system. The merge status information may be a merge log, an indicator of latest merge block, or any suitable parameter(s) that can indicate the redundancy of data between the real-time storage and the archive storage. Preferably this is a log of time blocks that have completed merging, in the progress of merging, and/or awaiting merging. The query cluster preferably uses the merge status information and client data timestamps to appropriately skip data from either the real-time storage system or the archive storage system if the skipped data will be accounted for in the other storage system as shown in FIG. 7.

An alternative embodiment preferably implements the above methods in a computer-readable medium storing computer-readable instructions. The instructions are preferably executed by computer-executable components preferably integrated with a data agent, a storage system, a query processing cluster, and an interface. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

As a person skilled in the art will recognize from the previous detailed description and from the figures and claims, modifications and changes can be made to the preferred embodiments of the invention without departing from the scope of this invention defined in the following claims.

We claim:
1. A method for operating a big-data platform comprising:
at a data analysis platform, receiving discrete client data;
storing the client data in a network accessible distributed storage system that includes:
    storing the client data in a real-time storage system in a row format;
    merging the client data into a columnar-based distributed archive storage system;
identifying a merge status for the client data merged into the archive storage system, wherein the merge status indicates a redundancy of client data between the real-time storage system and the archive storage system;

receiving a data query through a query interface; and processing the data query by selectively interfacing with the client data from the real-time storage system and archive storage system, according to a data mapping and reduction process, wherein the real-time storage system and the archive storage system are different, wherein processing the data query comprises:
  (i) converting the single data query from a relational database-type query format to a first converted query format compatible with the real-time storage system,
  (ii) converting the single data query from the relational database-type query format to a second converted query format compatible with the archive storage system,
  (iii) cooperatively querying the real-time storage system and the archive storage system by distributing, in parallel, the first converted query over the real-time storage system and the second converted query over the archive storage system,
  (iv) using the merge status and timestamps of the client data in the real-time storage system and the archive storage system to skip client data from either the real-time storage system or the archive storage system if the skipped data is accounted for in the other of the real-time storage system or the archive storage system, and
  (v) retrieving a single cohesive query result that incorporates real-time data and archive data returned from the first converted query and the second converted query, respectively, wherein merging the client data into a columnar-based distributed archive storage system comprises storing the client data in the archive storage system in a columnar format, and wherein interfacing with the client data from the archive storage system comprises:
  converting, by using a query processing cluster, at least a portion of the data query to the mapping process and the reduction process; and
  executing the mapping process and the reduction process by using the query processing cluster.

2. The method of claim 1, wherein discrete client data is received and stored with dynamic schema.

3. The method of claim 2, wherein the data query includes a schema definition and wherein selectively interfacing with the client data includes applying the schema definition to the dynamic schema.

4. The method of claim 1, further comprising at a client data agent collecting client data and transmitting the client data to the data analysis platform.

5. The method of claim 4, wherein the client data agent is integrated into an event channel from which client data is collected.

6. A method for operating a big-data platform comprising:
  at a client data agent, collecting discrete client data and transmitting the discrete client data to the data analysis platform, wherein the client data agent is integrated into an event channel from which client data is collected, wherein the event channel is selected from a list comprising syslog, a relational database, cloud data, and sensor data; and
  at a data analysis platform, receiving the discrete client data;

storing the client data in a network accessible distributed storage system that includes:
    storing the client data in a real-time storage system in a row format;
    merging the client data into a columnar-based distributed archive storage system, wherein merging the client data into a columnar-based distributed archive storage system comprises storing the client data in the archive storage system in a columnar format;
  identifying a merge status for the client data merged into the archive storage system, wherein the merge status indicates a redundancy of client data between the real-time storage system and the archive storage system;
  receiving a data query through a query interface; and
  processing the data query by selectively interfacing with the client data from the real-time storage system and archive storage system, according to a data mapping and reduction process, wherein processing the data query comprises cooperatively querying the real-time storage system and the archive storage system and distributing the data query over the real-time storage system and the archive storage system to retrieve a single cohesive query result,
  using the merge status and timestamps of the client data in the real-time storage system and the archive storage system to skip client data from either the real-time storage system or the archive storage system if the skipped data is accounted for in the other of the real-time storage system or the archive storage system, and
  wherein interfacing with the client data from the archive storage system comprises:
    converting, by using a query processing cluster, at least a portion of the data query to the mapping process and the reduction process; and
  executing the mapping process and the reduction process by using the query processing cluster.

7. The method of claim 4, further comprising at the client data agent serializing data into a binary serialization data-interchange that is transmitted to the data analysis platform.

8. The method of claim 4, wherein collecting client data is collected through a client agent data-input plugin.

9. The method of claim 1, wherein the columnar-based distributed archive storage system stores client data in time series order, and wherein selectively interfacing with client data includes querying data from distributed storage system.

10. The method of claim 1, wherein receiving a data query includes converting relational a database styled query to a data-intensive cluster query process.

11. The method of claim 1, wherein the data query is received through an infographics interface and further comprising returning an infographic from the selectively interfaced client data.

12. The method of claim 1, wherein receiving a data query includes receiving the data query through a business intelligence tool driver and further comprising returning data analytics results to the business intelligence tool driver.

13. The method of claim 1, wherein client data is associated with a user account through unique identifier.

14. The method of claim 13, wherein client data merged into the archive data storage system is isolated according to the user account associated with the client data and the query processing cluster interfaces with the distributed storage system, and the query processing cluster is shared between by a plurality of user accounts.

15. The method of claim 1, further comprising at a client data agent collecting client data and transmitting the client data to the data analysis platform; wherein the columnar-based distributed archive storage system stores client data in time series order with a dynamic schema, and wherein selectively interfacing with client data includes cooperatively querying data from the real-time storage system and the archive storage system for a cohesive query result.

16. The method of claim 15, wherein distributed storage system includes over one petabyte of data.

17. The method of claim 1, wherein the mapping process and the reduction process are MapReduce processes.

18. The method of claim 1, wherein the query processing cluster is constructed to execute MapReduce processes, and the mapping process and the reduction process are MapReduce processes.

19. The method of claim 1, wherein the query processing cluster includes a cluster that is constructed to execute MapReduce processes, and the mapping process and the reduction process are MapReduce processes.

20. The method of claim 1, wherein the data analysis platform is a multi-tenant data analysis platform.

21. The method of claim 1, wherein the query result includes structured data.

22. The method of claim 2, wherein the data analysis platform is a multi-tenant data analysis platform.

23. The method of claim 3, wherein the data analysis platform is a multi-tenant data analysis platform.

24. A method comprising: at a multi-tenant data analysis platform:
 receiving discrete client data, the client data being associated with a user account of the multi-tenant data analysis platform through a unique identifier;
 storing the client data in a network accessible distributed storage system that includes a real-time storage system and a columnar-based distributed archive storage system, the storing of the client data comprising:
  storing the client data in the real-time storage system in a row format;
  merging the client data into the archive storage system in a columnar format, the client data merged into the archive data storage system being isolated according to the user account associated with the client data;
 identifying a merge status for the client data merged into the archive storage system, wherein the merge status indicates a redundancy of client data between the real-time storage system and the archive storage system;
 receiving a data query through a query interface; and
 processing the data query by selectively interfacing with the client data from the real-time storage system and archive storage system, wherein processing the data query comprises:
  converting the data query from a relational database-type query format to a first converted query format compatible with the real-time storage system and a second converted query format compatible with the archive system, wherein the converting the data query comprises converting, by using a query processing cluster, the data query to a MapReduce mapping process and a MapReduce reduction process,
  cooperatively querying the real-time storage system and the archive storage system by distributing, in parallel, the first converted data query over the real-time storage system and the second converted query over archive storage system,
  using the merge status and timestamps of the client data in the real-time storage system and the archive storage system to skip client data from either the real-time storage system or the archive storage system if the skipped data is accounted for in the other of the real-time storage system or the archive storage system, and
  retrieving a single cohesive query result based on results from both the real-time storage system and the archive storage system,
 wherein interfacing with the client data from the archive storage system comprises:
  executing the MapReduce mapping process and the MapReduce reduction process by using the query processing cluster, and
 wherein the query processing cluster includes a cluster that is constructed to execute MapReduce processes.

* * * * *

UNITED STATES PATENT AND TRADEMARK OFFICE
CERTIFICATE OF CORRECTION

PATENT NO. : 9,582,528 B2  
APPLICATION NO. : 15/147790  
DATED : February 28, 2017  
INVENTOR(S) : Sadayuki Furuhashi et al.

Page 1 of 1

It is certified that error appears in the above-identified patent and that said Letters Patent is hereby corrected as shown below:

In the Claims

In Column 10, Line 50, "converting relational a database" should read, "converting a relational database"
In Column 10, Line 61, "through unique identifier" should read, "through a unique identifier"
In Column 12, Line 9, "and archive storage system" should read, "and the archive storage system"
In Column 12, Line 24, "over archive storage system" should read, "over the archive storage system"

Signed and Sealed this
Nineteenth Day of September, 2017

Joseph Matal
*Performing the Functions and Duties of the
Under Secretary of Commerce for Intellectual Property and
Director of the United States Patent and Trademark Office*